I. H. LEVIN.
ELECTROLYTIC GAS GENERATOR.
APPLICATION FILED MAY 22, 1917.

1,372,442. Patented Mar. 22, 1921.
3 SHEETS—SHEET 2.

INVENTOR.
Isaac H. Levin
BY Ralph H. Flint
ATTORNEY

I. H. LEVIN.
ELECTROLYTIC GAS GENERATOR.
APPLICATION FILED MAY 22, 1917.

1,372,442.

Patented Mar. 22, 1921.
3 SHEETS—SHEET 3.

UNITED STATES PATENT OFFICE.

ISAAC H. LEVIN, OF NEW YORK, N. Y., ASSIGNOR TO ELECTROLYTIC OXY-HYDROGEN LABORATORIES, INC., OF NEW YORK, N. Y.

ELECTROLYTIC GAS-GENERATOR.

1,372,442.   Specification of Letters Patent.   Patented Mar. 22, 1921.

Application filed May 22, 1917. Serial No. 170,125.

*To all whom it may concern:*

Be it known that I, ISAAC H. LEVIN, a citizen of the United States, and a resident of New York, in the county of New York and State of New York, have invented certain new and useful Improvements in Electrolytic Gas-Generators, of which the following is a full, clear, concise, and exact description, such as will enable others skilled in the art to which the invention relates to make and use the same, reference being made therein to the accompanying drawing, which forms a part of this specification.

My invention relates to electrolytic gas generators designed to produce hydrogen and oxygen gases by subjecting water containing a small quantity of a suitable electrolyte such, for example, as potassium hydroxid, sulfuric acid, etc., to the action of a current of electricity which is caused to flow therethrough; whereby oxygen is liberated at the positive electrode or anode of the generator, and hydrogen at the negative electrode or cathode; all in accordance with the well known phenomena commonly referred to as the decomposition of water by means of a current of electricity.

My invention relates particularly to that type or class of electrolytic gas generators in which the liquid acted upon is contained in a suitable receptacle or casing made up of two or more parts or casing members electrically insulated from one another, and in which the casing members themselves form the electrodes from which the current passes into and through the liquid, the conductors through which current is supplied to the generator being connected directly to the casing members and said members being made of metal, so that the current may flow through them and into the liquid; as distinguished from electrolytic gas generators in which the electrodes are independent of and are insulated from the casing which contains the liquid acted upon.

The objects of my invention are to provide an electrolytic gas generator of the type or kind above referred to wherein an improved form and arrangement of casing members are employed, whereby lower electrical resistance and increased gas generating capacity are secured; to provide an improved electrolytic gas generator in which the casing is made up of a plurality of parts or sections secured together, whereby a generator of greater gas generating capacity than a generator having a casing made up of two parts or sections, and a generator of greatly reduced resistance, is secured; to provide an electrolytic gas generator in which the sections of the casing form the electrodes, and in which a porous diaphragm or diaphragms whereby the interior of the casing is divided into two or more compartments, is non-conducting in character, as distinguished from being made of metal as has heretofore been the case; to provide an electrolytic gas generator in which the porous diaphragm or diaphragms employed for preventing the gases produced from mingling below the surface of the liquid, and which diaphragm or diaphragms divide the lower portion of the interior of the casing into two or more compartments, is so arranged and located that it will always be submerged when the generator is in operation; to provide improved means for holding the porous diaphragm employed in gas generating and other electrolytic devices in place relative to the sections which form the liquid containing casing of the device; to provide a plan and arrangement whereby one or more separate and distinct gas generating units of the type or class above referred to may be connected with and adapted to discharge into a single pair of offtake conduits; to provide an improved device for supplying liquid to the various compartments within the casing of electrolytic gas generators and which device serves also as a safety device in case the pressure within the compartment which it supplies becomes too great, and as an outlet for the gas produced within the compartment should the liquid in any particular compartment or in the casing as a whole become so low as to interfere with the proper operation of the generator; to provide improved means for supporting gas generating devices of the type herein referred to from the floor or support provided for them; and to otherwise improve upon and enhance the efficiency of electrolytic gas generating devices of the general type or kind to which my invention relates.

With the above enumerated and other objects of invention in view my invention consists in the improved electrolytic gas generator and component elements, parts, and features thereof illustrated in the accompanying drawings, and hereinafter described and particularly claimed, and in such variations and modifications thereof as will be obvious to those skilled in the art to which my invention relates.

In the drawings accompanying and forming a part of this specification and wherein the preferred embodiment of my invention is illustrated.

Figure 12:
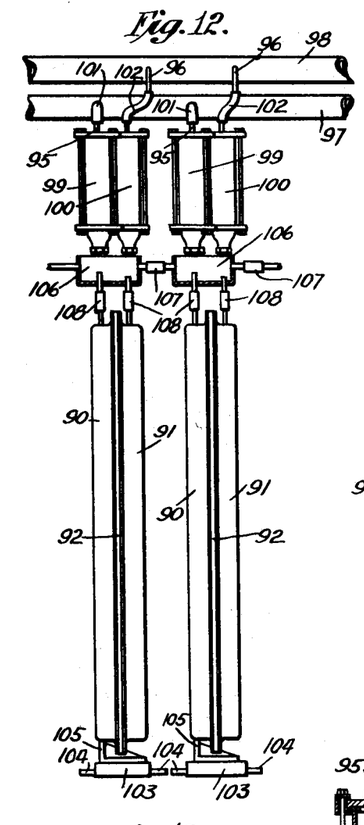
Fig. 12 is a view showing two gas generating units of a form differing from the forms shown in the other views, in end elevation, and as adapted to discharge into a single pair of gas offtake conduits or mains.
Figure 13:
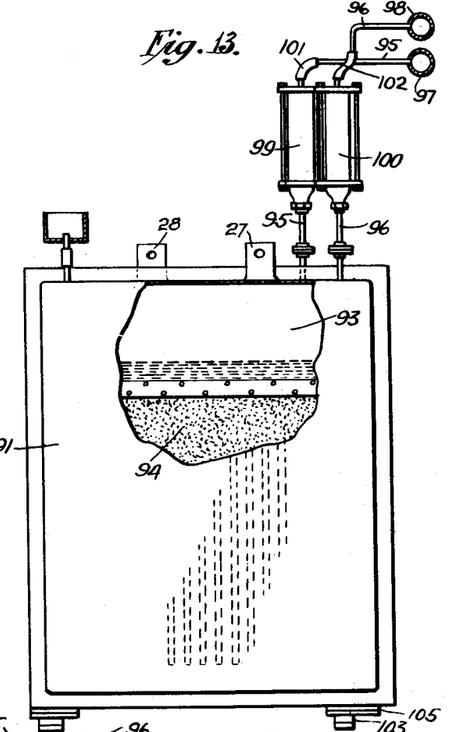
Fig. 13 is a view illustrating one of the gas generating elements shown in Fig. 12 in side elevation, and broken away to show features of interior construction.

Referring first to Figs. 1 to 3, and 16, the casing of the generator illustrated therein is made up of three parts or sections secured together but insulated from one another, the end section members being alike in form and the single intermediate section being functionally the equivalent of two end sections; so that the capacity of a generator having a three part casing is substantially the same as that of two generators the casings of which are in two parts (as illustrated in Figs. 12 and 13), while the cost, weight, and space occupied by a single three section generator are materially less than would be the case if two generators each made up of two casing sections were employed. The end section members each comprise an end wall 20 of large area, and a peripheral wall 21 of comparatively slight length or height measured away from the end wall and which peripheral or side wall terminates in a flange 22; while the intermediate section comprises a central web or wall 23 corresponding in area and function with the end walls 20, and a peripheral wall 24 extending upon each side of said central wall a distance corresponding approximately with the height of the peripheral walls 21 of the end section members. The three casing members are preferably connected together as shown by means of a plurality of clamping members 25 sufficiently numerous to prevent leakage from the casing; although they may obviously be secured together by means of bolts if deemed necessary or desirable. Suitable packing strips 26 made of insulating material are interposed between the meeting edges of the casing members whereby tight joints are secured and the casing members are insulated from one another, and suitable conductors are to be connected with terminals 27, 28 through which the generator may be supplied with current; the casing members being made of metal, preferably iron, so that they serve as electrodes, and the terminals of the outer sections being both connected with one conductor and that of the inner with the other, so that the outer sections are both of one polarity and the inner of the other, as indicated and as will be understood.

Figure 1:
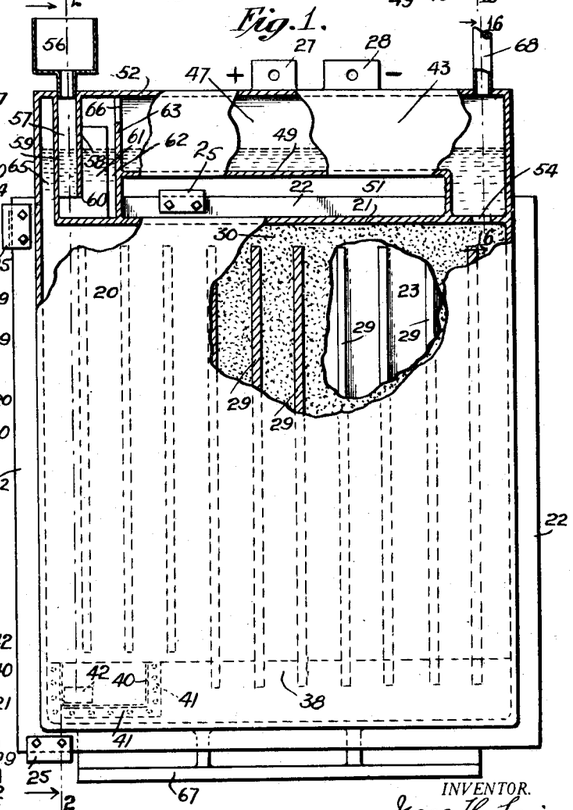
Figure 1 is a view illustrating one form of my improved electrolytic gas generating device partly in side elevation and partly in section upon a vertical longitudinally extending plane indicated by the line 1, 1, Fig. 3.
Figure 2:
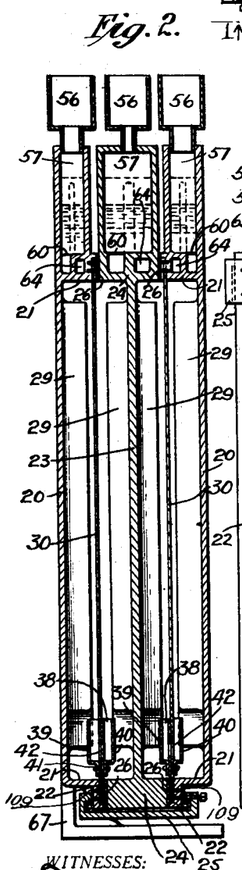
Fig. 2 is a view illustrating my generator in section and upon a vertically extending transverse plane indicated by the line 2, 2, Figs. 1 and 3.
Figure 3:
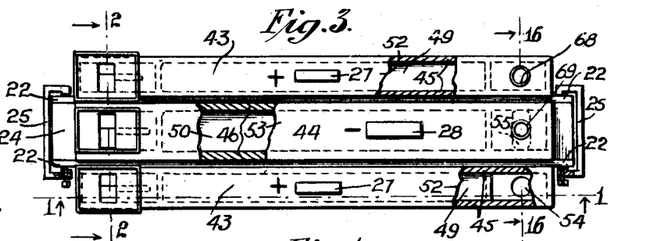
Fig. 3 is a view illustrating my device mainly in plan, but broken away in places to better show features of internal construction.

The construction above described provides section members which may properly be referred to as recessed, and the casing formed by securing them together will have two internal liquid containing compartments of large area, but of comparatively slight depth as measured from the wall 20 to the wall 23, so that the resistance of the generator will be small, and, in order to provide a greater area of contact between the casing members and the liquid within the casing and to further reduce the resistance of the generator the inner surfaces of the end walls 20, and both sides of the web or wall 23 (which is in effect an end wall for both the liquid compartments), are provided with ribs 29 extending toward one another and into the liquid compartments, as shown.

Figure 15:
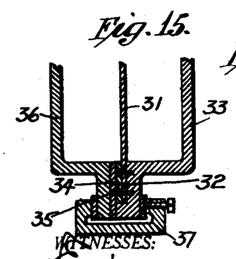
Fig. 15 is a view showing the manner in which the porous diaphragm is secured to a section of the casing of my device, and the way in which adjacent sections are insulated from one another and secured together, upon an enlarged scale; and, Fig. 16 is a fragmentary view illustrating a section upon a vertically extending transverse plane indicated by the line 16, 16, Figs. 1 and 3.

Located within the liquid containing compartments and serving to divide the same into two equal parts are porous diaphragms 30 made preferably of asbestos and the purpose of which is to prevent the gases produced from mingling as they pass upward through the liquid, the said diaphragm in effect dividing the liquid compartment into two chambers one of which when the generator is in operation contains bubbles of oxygen gas passing upward through the liquid, while bubbles of hydrogen gas pass upward through the liquid in the other chamber. The said diaphragm is supported entirely by one of the casing members so that it may be secured in place and inspected to detect imperfections, either inherent or developed or produced in the act of assembling the parts, before closing the casing by securing another casing member to the one carrying the diaphragm. This end is preferably accomplished by providing a recess in the flange or side wall of one of the casing members and extending around the periphery of the opening therein, and adjacent which flange a like but not recessed flange or wall of another casing member will lie when the parts are essembled; and securing the periphery of the diaphragm within the recess by means of a retaining strip. This contruction is shown in Fig. 1; and is shown upon a larger scale (but applied to a generator casing made up of two casing members or sections) in Fig. 15, wherein 31 designates the diaphragm, 32 the recess which extends all around the opening in the casing section 33, and 34 a holding strip (which may or may not be of insulating material) secured in place as by means of screws and whereby the periphery of the diaphragm is held in place in the recess. The holding strip 34, as well as the portion of the flange beyond the recess, are both covered by the insulating packing strip 35, and the second casing member 36 and the one first mentioned are held together by means of a clamp 37, or otherwise, as will be appreciated. In Figs. 1 and 2 the holding strips 38 at the bottom of the casing and diaphragms are shown wider than would be necessary for holding the lower edge of the diaphragms in place within the recesses, and 39, 40 designate two recessed channels or open sided cups each having a flange 41 extending along the bottom and up the sides thereof through which flanges, holding strip, and diaphragm screws or rivets extend, whereby the channels are held in place and supported by the strip 38. A hole 42 is located at the bottom of the channels and extends through the strip 38 and diaphragm; and the purpose of the elements here referred to is to establish a passage from one side of the diaphragm to the other through which liquid may flow to equalize the pressure and level of the liquid upon the two sides of the diaphragm, while at the same time preventing the passage of bubbles from one side thereof to the other, as indicated by the arrows in Fig. 5 wherein an equivalent device is illustrated.

Figure 16:
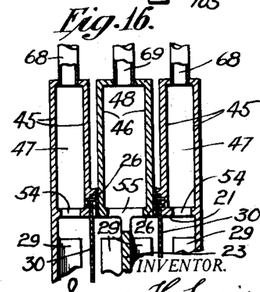

In the form of my invention illustrated in Figs. 1 to 3 the separate members which collectively form the casing extend above, and the liquid normally stands in all of them some distance above the upper end of the diaphragms, so that the diaphragms are entirely submerged when the generator is in operation. The upper ends of the casing members are indicated by the reference numerals 43, 44; and the said upper ends are narrowed somewhat so that they are spaced apart from one another above the flanges 22 where the upper edge of the diaphragms lie, as shown in Fig. 2 These narrowed upper ends being separate and distinct from one another are necessarily provided each with side walls as shown at 45, 46, whereby gas chambers 47, 48, see Fig. 16, are provided above the normal liquid level as indicated; and they are also provided with bottom walls 49, 50 whereby a space 51 is provided between the said bottom walls and the flanges 22 so that access may be had to the said flanges and the clamps 25 whereby the casing members are held together can be put in place and properly adjusted. The upper ends of the gas chambers are of course closed as by top walls 52, 53, and the liquid and gas chambers thus provided above the flanges 22 are placed in communication with the liquid containing compartments below said flanges through one or more passages as best shown in Fig. 16, so that the gases produced may pass upward from the liquid containing compartments and accumulate in the gas chambers; the passages or openings 54 extending through the top walls of the outer casing members while the opening 55 extends through the top wall of the intermediate member and communicates with the space at both sides of the central web 23 thereof.

Liquid is supplied to the liquid containing compartments below the flanges 22 through filling devices, one for each casing section, the same being formed integrally with the said sections as the same is cast in the embodiment of my invention illustrated in Figs. 1 to 3 by the use of suitable cores; and each of which filling devices provides a tortuous passage communicating with the liquid compartment and also with the gas chamber of the section with which it is associated. These devices are so designed as to act as safety devices in case the gas pressure becomes too great within the gas chambers, and also as vents for permitting a free flow of gas from the chambers in case the level of the liquid in the casing becomes too low; the structural features of the said filling devices and their operation being as follows; the same reference numerals being used to designate like parts of them and the description being in the singular, as they are alike in structure and operation.

The reference numeral 56 designates a filling cup from which the liquid descends through a passage 57 between a partition 58 and a wall 59 and flows beneath the lower edge 60 of said partition; then flows to the right, Fig. 1, in front of a partition 61; then through a space 62 between the end of said partition and a wall 63; then to the left back of the partition 61, and through a passage 64 which leads into a vertically extending passage 65 which discharges into the liquid compartment below the upper edge of the diaphragm; the passage 65 for the middle casing section being in communication with the space upon each side of the wall or web 23 as will be appreciated. The wall 63 is provided with an opening 66 at its upper end through which communication is established between each filling device and the gas chamber of the section with which it is associated.

When the generator is in operation there is a considerable surging of liquid back and forth through the liquid supply passage above traced, which liquid carries considerable gas with it in the form of minute bubbles not yet separated therefrom. The liquid supply passage, however, being tortuous, and comparatively long, the gas will separate from the liquid as it flows from the liquid compartment and will pass into the gas chamber through the opening 66, whereas if liquid having gas entrained therein were to be forced back even temporarily into the filling cups 56 the gas would escape into the atmosphere.

Should the pressure within the generator become too great it is obvious that the liquid will be forced backward through the supply passage above traced and into the filling cups; and, should the level of liquid within the casing fall below the lower edge 60 of the partition 58, either because of neglect to supply liquid to the generator when needed to supply the loss due to the production of the gases, or because of liquid being forced from the casing due to too high gas pressure therein, then gas will flow from the gas chambers through the passages 66 and 57 and directly into the surrounding atmosphere.

Figs. 6 to 11 illustrate a liquid supply and safety device which is separate and distinct from the casing sections, but which is made up of elements like the elements of the feed device above described and operates in precisely the same way; this form permitting the use of a simpler construction of casing member, and being capable of use in and as a part of electrolytic gas generators of any form wherein liquid has to be supplied to an internal chamber or compartment.

Figure 8:
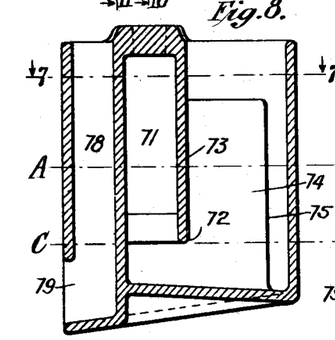
Figs. 8 and 9 are views showing sections of the water supply device upon longitudinally extending vertical planes indicated by the lines 8, 8 and 9, 9, Fig. 6.
Figure 9:
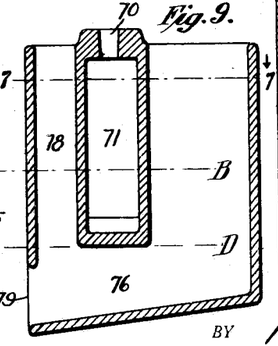
Figure 10:
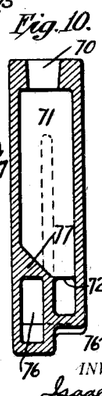
Figs. 10 and 11 are views showing sections of the said device upon transversely extending vertical planes indicated by the lines 10, 10 and 11, 11, Fig. 6.
Figure 11:
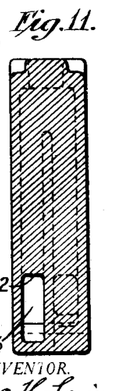

In this form of liquid feed device the liquid is supplied through a suitable conduit connected with the opening 70, and flows downward through a passage 71 and beneath the lower end 72 of a partition 73; then to the right, Fig. 8, in front of a partition 74, and backward past the end 75 thereof; then to the left, Fig. 9, back of said partition and through a passage 76 cut off from the passage 71 by a wall 77, Fig. 10; then past the lower end of a vertically extending passage 78 and through an opening 79 into the liquid chamber; the upper end of the passage 78 and the space above the partition 74 being in open communication with the gas space above the liquid in the compartment supplied by the device.

The normal water level is indicated by the line A B, and, as liquid carrying bubbles of gas is forced backward through the passage above traced due to slight variations of gas pressure the gas will separate therefrom and pass into the gas chamber through the openings at the upper end of the passage 78 and above the partition 74; while if the gas pressure becomes too great for a longer time liquid will be forced back through said passage until the excess pressure is relieved. On the other hand if the level of the liquid falls below the level indicated by the line C D either as the result of back flow due to too great gas pressure, or because of a failure to supply liquid to the generator when needed, then the gas will pass through the open top of the chamber above the partition 74, beneath the lower end 72 of the partition 73, and up the passage 71 to the atmosphere; there being no liquid in the device to seal the lower end of the passage 71 when the level of liquid falls below the lower end 72 of the partition 73, as will be appreciated.

Referring again and finally to the form of my device illustrated in Figs. 1 to 3, the entire generator is supported by a foot or bracket 67 carried by one only of the casing members, the same being either formed integrally with a casing section or separate therefrom and secured thereto; and said supporting means will be as long as may be deemed necessary to support the generator, and may be provided with strengthening ribs as shown, or may be in the form of two or more supports spaced apart from one another and all carried by one and the same casing member, all according to the exigencies of the case and the choice of the maker or user of my gas generating device. This construction of support prevents the sections of the generator from becoming short circuited through the base or support, as is liable to happen with the use of a support insulated from but which affords support to casing members of opposite polarity, and provides a construction in which the support need not be insulated from the generator casing, as will be appreciated.

Figure 14:
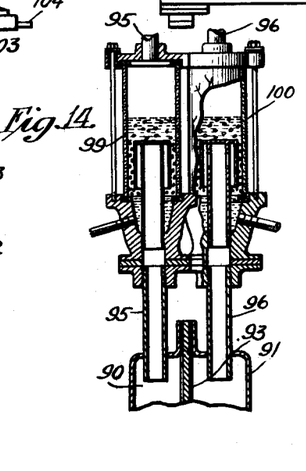
Fig. 14 is a fragmentary view illustrating certain indicating devices ordinarily employed in all forms of my generator, and through which the gases produced flow, although the said devices are omitted in the forms other than that shown in Figs. 12 and 13.

The gases produced pass from the gas chambers 47, 48 through gas outlet conduits 68, 69 in which suitable indicating devices or lanterns are included for indicating whether or not the gases are being properly generated; such devices being omitted in Figs. 1 to 3 for lack of room, but being shown as applied to a similar generator so far as concerns the gas outlet conduits in Figs. 12 and 13, and the construction of such indicating devices is shown in detail in Fig. 14.

Figure 4:
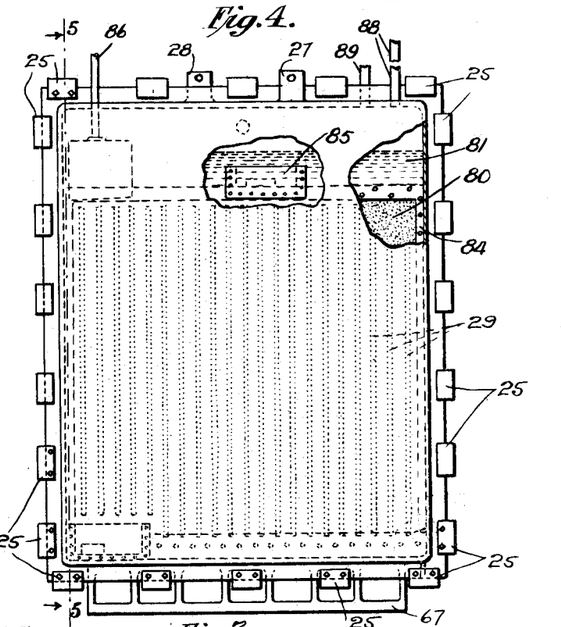
Fig. 4 is a view illustrating another form of my generator mainly in side elevation, but broken away in places to show features of internal elements of the device.
Figure 5:
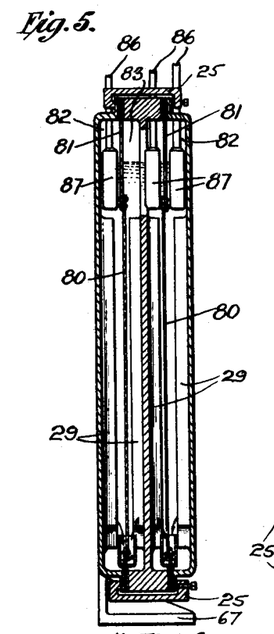
Fig. 5 is a view illustrating my improved generator in section and upon a vertically extending transverse plane indicated by the line 5, 5, Fig. 4.
Figure 6:
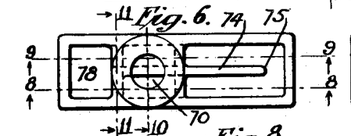
Fig. 6 is a plan view showing an improved water supply, gas outlet, and safety device employed for supplying water to the various compartments within the casing of my gas generating device, upon a considerably enlarged scale.
Figure 7:
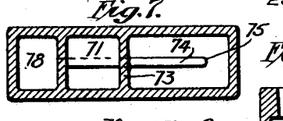
Fig. 7 is a view showing a section of the said water supply device upon a horizontal plane indicated by the line 7, 7, Figs. 8 and 9.

Figs. 4 and 5 illustrate a form of my invention in which the casing is made up of three casing members or sections as in the form above described, but in which the liquid chambers above the upper end of the diaphragm are not used, whereby the form of the casing members is simplified. In this form the casing members are provided with internal ribs, are all supported by means of a support carried by one of the casing members, and they are secured together by clamps as aforesaid; although it will be noted that the clamps are not insulated from the casing members, as is the case in Figs. 1 to 3, wherein insulating members 109 are shown as interposed between the jaws of the clamps 25 and the adjacent surfaces of the flanges 22 of the peripheral walls 21 of the end sections of the casing, it being obvious that the end casing members with which the clamps engage being of like polarity need not be insulated from one another, although both must be insulated from the intermediate casing member.

In this form the porous diaphragms 80 are secured to and carried by frame members having upper portions 81 which form non-pervious partitions and divide the upper end of the interior of the casing so as to provide two gas chambers 82 in which gas of one kind accumulates, and a third gas chamber 83 in which gas of the other kind accumulates; said frame members having oppositely located depending side portions, one of which is shown at 84, and a bottom bar or strip shown in dotted lines in Fig. 4; thus providing an opening in the frame along and around the edge of which the periphery of the diaphragm is secured. The bottom bar carries means for establishing a passage from one chamber to another as hereinbefore explained, and a like device shown at 85 in Fig. 4 only is provided to permit a flow of liquid from one chamber to the other at the upper end of the casing, which device need not, it is believed, be described in detail. Liquid is supplied to the liquid compartments provided by the diaphragms through conduits 86, and safety devices 87 such as are shown in Figs. 6 to 11 and hereinbefore described at length; and the gasses flow from the gas chambers through outlet conduits 88 for one kind of gas, and 89 for the other, in which conduits suitable indicating devices or lanterns to be hereinafter described will be included, as will be appreciated.

The frame members above referred to may be made of any suitable material and are packed and insulated from the casing members by means of packing strips as shown; and the pervious or porous diaphragms carried by said frame members are made from a non-metallic insulating material in order that they may under no circumstances become in effect electrodes. This is of importance in generators in which the casing members serve also as electrodes, for the reason that in such a generator if the electromotive force between any two sections separated by a diaphragm becomes greater than about 3.5 volts (this being about twice the voltage necessary to accomplish the decomposition of water as will be appreciated), then if a metallic diaphragm is used the fall of potential between it and each adjacent casing member will be sufficient to decompose water, and both hydrogen and oxygen will be produced in the generating chambers upon each side of the diaphragm in question. No such action is possible, however, if the diaphragm is non-metallic and is a non-conductor of electricity, as will be appreciated, for the said diaphragm can under no circumstances become and act as an electrode.

Figs. 12 to 14 illustrate a form of my invention in which the casing of the generator is made up of two casing members or sections 90, 91 secured together and having a frame member 92 held in place between the meeting edges of the casing members, and the upper end 93 of which forms a partition as hereinbefore explained in describing the form of my invention illustrated in Figs. 4 and 5; and 94 designates a porous diaphragm carried by said partition and dividing the interior of the casing into two compartments the upper ends of which are gas chambers, as will be appreciated.

The gases produced flow from the gas chambers through outlet conduits 95, 96 and into gas mains 97, 98; said conduits including suitable indicating devices or lanterns 99, 100 comprising glass cylinders held between suitable heads and containing water through which the gas passes in the form of bubbles, as indicated in Fig. 14, thereby providing a visible indication as to whether or not the gases are flowing properly from the generator; said devices being similar in construction and operation to the equivalent devices illustrated and described in my patent for electrolytic gas generator No. 1,219,966 dated March 20th, 1917.

The indicating devices above referred to are insulating in character, and additional insulating means in the form of sections 101, 102 of non-conducting tubing are preferably included in said gas outlet conduits in order to more completely insulate the casing sections from the metallic gas offtake mains; it being extremely important in gas generators wherein the casing members form electrodes that the said members be insulated from one another as completely as possible, as otherwise the casing members will be short circuited through the offtake gas conduits and mains, or a serious loss of current will occur if the insulation provided in said conduits is defective to any appreciable extent.

Fig. 12 shows a plurality of gas generating units all insulated from and discharging into a single pair of gas offtake mains, the separate units being supported by insulating members or blocks 103 having projections 104 which prevent the generating units which they support from being placed too near one another; the separate units being supported by and through brackets 105 carried by one only of the sections thereof, as hereinbefore explained. In the arrangement here referred to the filling receptacles 106 for supplying liquid to the separate units are of the type disclosed in my patent above referred to; and they are shown as connected with one another through conduits having insulating sections 107, and with the casing sections through conduits having insulating sections 108, in order to prevent leakage of current through the liquid supply means, as will be appreciated.

The packing or rather combined packing and insulating strips employed between the meeting edges of the casing members and elsewhere about my generator, and which have been usually referred to simply as packing members or strips, are made from a special packing and insulating material which I have found to be especially effective in and particularly well adapted for use wherever such a material is used in electrolytic gas generating devices; the said material being composed of a plurality of layers of thin asbestos felt, each coated with rubber or equivalent material, and all the layers being pressed together and preferably vulcanized to a greater or less extent by the incorporation of sulfur with the rubber, whereby an insulating and packing strip made up of layers of asbestos and rubber vulcanized to a greater or less degree is secured.

Having thus described and explained my invention, I claim and desire to secure by Letters Patent:

1. In an electrolytic gas generator, a casing having a plurality of internal gas generating chambers; and a plurality of separate liquid supply devices independent of one another and associated one with each of said gas generating chambers; each of said liquid supply devices having means associated therewith for permitting gas to flow from the chamber which it supplies upon a rise of pressure within said chamber, or in case the surface of the liquid within said chamber falls below a pre-determined level.

2. In an electrolytic gas generator, a casing having a plurality of internal gas generating chambers; and a plurality of separate liquid supply devices independent of one another and associated one with each of said gas generating chambers; each of said liquid supply devices having liquid sealing means for normally preventing the flow of gas from the chamber with which it is associated, and means associated with the liquid sealing means for permitting a flow of gas from said chamber upon a rise of gas pressure therein, or upon a fall of the level of liquid therein below a pre-determined point.

3. In an electrolytic gas generator, a casing comprising a plurality of casing members insulated from one another and secured together; means for dividing the interior of said casing into a plurality of gas generating chambers; and a plurality of combined liquid supply and gas outlet devices separate and independent of one another and associated one with each of said chambers, and through which devices liquid may be supplied to each chamber and gas may escape therefrom under abnormal conditions.

4. In an electrolytic gas generator, a casing comprising a plurality of recessed casing members insulated from one another and secured together, and which casing members form electrodes for the generator; a plurality of porous diaphragms located within the casing and the peripheries of which are held in place between the meeting edges of adjacent casing members, and which diaphragms divide the interior of said casing into a plurality of gas generating chambers; a plurality of combined liquid supply and gas outlet devices separate and independent from one another and associated one with each of said chambers, each of said devices having a tortuous passage through which liquid may flow into the gas generating chamber with which it is associated, and a portion of which passage is open so that gas which separates from the liquid may pass through said opening.

5. In an electrolytic gas generator, a casing comprising a plurality of recessed casing members insulated from one another and secured together, and which casing members form electrodes for the generator; a plurality of porous diaphragms located within the casing and the peripheries of which are held in place between the meeting edges of adjacent casing members, and which diaphragms divide the interior of said casing into a plurality of gas generating chambers; and a plurality of combined liquid supply and gas outlet devices separate and independent from one another and associated one with each of said gas generating chambers, each of said devices having a tortuous passage leading into the chamber with which said device is associated and through which liquid may flow thereinto, said passage including a chamber having an opening in its upper portion and through which gas which separates from the liquid may pass into said gas generating chamber.

6. In an electrolytic gas generator, a casing comprising a plurality of recessed casing members insulated from one another and secured together, and which casing members form electrodes for the generator; a plurality of porous diaphragms located within the casing and the peripheries of which are held in place between the meeting edges of adjacent casing members, and which diaphragms divide the interior of said casing into a plurality of gas generating chambers; and a plurality of combined liquid supply and gas outlet devices separate and distinct from one another and associated one with each of said gas generating chambers, each of said devices comprising a vertically extending passage, and a tortuous passage forming a continuation thereof and discharging into said liquid chamber; each liquid supply device including a liquid containing chamber open at its upper portion and through which opening gas which separates from the liquid may pass into said gas generating chamber, and the liquid within which last mentioned chamber forms a seal for the lower end of the vertically extending passage aforesaid.

7. In an electrolytic gas generator, a casing comprising recessed casing members insulated from one another and secured together whereby an internal liquid containing compartment is provided, and which casing members form electrodes for the generator; a porous diaphragm located within the casing and serving to divide said compartment into two chambers; means for providing a passage through which liquid may flow from one of said chambers to the other; a plurality of combined liquid supply and gas outlet devices associated one with each of said casing members for supplying liquid to said chambers; and means for conducting the gases produced from said chambers.

8. In an electrolytic gas generator, a casing comprising recessed casing members secured together whereby an internal liquid containing compartment is provided; and means carried by one only of said casing members for supporting said casing.

9. In an electrolytic gas generator, a casing comprising recessed casing members secured together whereby an internal liquid containing compartment is provided; and a support carried by the lower end of one only of said casing members for supporting said casing.

10. In an electrolytic gas generator, a casing comprising recessed casing members insulated from one another and secured together whereby an internal liquid containing compartment is provided, and which casing members form electrodes for the generator; and means carried by one only of said casing members for supporting said casing.

11. In an electrolytic gas generator, a casing comprising recessed casing members insulated from one another and secured together whereby an internal liquid containing compartment is provided, and which casing members form electrodes for the generator; and a support carried by the lower end of one only of said casing members for supporting said casing.

12. In an electrolytic gas generating apparatus, a plurality of separate gas generating units; insulating members whereby said units are supported; and projections carried by said insulating members for spacing said units proper distances from one another.

13. In an electrolytic gas generating apparatus, a plurality of separate gas generating units all of which are adapted to discharge into a single pair of gas offtake mains; insulating supports for supporting said units; and projections extending from said supports, the projections of adjacent supports being adapted to engage one another to thereby space said units a proper distance from one another.

14. In an electrolytic gas generator, a casing comprising recessed casing members insulated from one another and secured together whereby an internal liquid containing compartment is provided; a porous diaphragm located within said casing and serving to divide said compartment into two gas generating chambers; liquid containing chambers separate and distinct from one another and communicating one with each of said casing members, and which chambers extend above the upper end of said diaphragm whereby the same is normally submerged; means for supplying liquid to said liquid containing compartment; and a gas outlet conduit leading from each of said liquid containing chambers.

15. In an electrolytic gas generator, a casing comprising recessed casing members insulated from one another and secured together whereby an internal liquid containing compartment is provided; a porous diaphragm located within said casing and serving to divide said compartment into two gas generating chambers; liquid containing chambers separate and distinct from one another and communicating one with each of said casing members, and which chambers extend above the upper end of said diaphragm whereby the same is normally submerged; a liquid supply device formed integrally with each of said chambers and discharging into the interior of said casing, and having a passage leading into the upper end of the chamber with which it is associated; and a gas outlet conduit leading from each of said liquid containing chambers.

16. In an electrolytic gas generator, a casing comprising recessed casing members insulated from one another and secured together whereby an internal liquid containing compartment is provided; a porous diaphragm located within said casing and serving to divide said compartment into two gas generating chambers; liquid containing chambers separate and distinct from one another and communicating one with each of said casing members, and which chambers extend above the upper end of said diaphragm whereby the same is normally submerged, said chambers being spaced apart from said casing members so that an opening is provided between them and said casing members; means for supplying liquid to the interior of said casing; and a gas outlet conduit leading from each of said liquid containing chambers.

17. In an electrolytic gas generator, a casing comprising recessed casing members insulated from one another and secured together whereby an internal liquid containing compartment is provided, and which casing members form electrodes for the generator; a porous diaphragm located within said casing and the periphery of which lies between the meeting edges of said casing members; liquid containing chambers separate and distinct from one another and communicating one with each of said casing members, and which chambers extend above the upper end of said diaphragm whereby the same is normally submerged; means for supplying liquid to the interior of said casing; and a gas outlet conduit leading from each of said chambers.

18. In an electrolytic gas generator, a casing comprising recessed casing members insulated from one another and secured together whereby an internal liquid containing compartment is provided, and which casing members form electrodes for the generator; a porous diaphragm located within said casing and the periphery of which lies between the meeting edges of said casing members; liquid containing chambers separate and distinct from one another and communicating one with each of said casing members, and which chambers extend above the upper end of said diaphragm whereby the same is normally submerged, said chambers being spaced apart from said casing members so that an opening is provided between them and said casing members; means for supplying liquid to said liquid containing compartment; and a gas outlet conduit leading from each of said chambers.

19. In an electrolytic gas generator, a casing comprising three recessed casing members insulated from one another and secured together whereby two internal liquid containing compartments are provided; two porous diaphragms located within said casing and the peripheries of which diaphragms lie between the meeting edges of said casing members; liquid containing chambers separate and distinct from one another and communicating one with each of said casing members, and which chambers extend above the upper ends of said diaphragms whereby they are normally submerged; means for supplying liquid to said liquid containing compartments; and a gas outlet conduit leading from each of said chambers.

20. In an electrolytic gas generator, a casing comprising a plurality of casing members secured together; means for dividing the interior of said casing into a plurality of gas generating chambers; and a plurality of combined liquid supply and gas outlet devices separate and independent from one another and associated one with each of said casing members, and through which liquid may be supplied to said chambers and gas may escape therefrom under abnormal conditions; each liquid supply device being formed integrally with the casing member with which it is associated.

21. In an electrolytic gas generator, a casing comprising a plurality of casing members insulated from one another and secured together, and which casing members form electrodes for the generator; means for dividing the interior of said casing into a plurality of gas generating chambers; and a plurality of combined liquid supply and gas outlet devices separate and independent from one another and associated one with each of said casing members, and through which liquid may be supplied to said chambers and gas may escape therefrom under abnormal conditions; each liquid supply device being formed integrally with the casing member with which it is associated.

22. In an electrolytic gas generator, a casing comprising two end casing members of like polarity, a third member of opposite polarity and comprising a peripherally extending frame or wall insulated from said end casing members and adapted to form therewith a container for lliquid, and means for securing said members together; and means for keeping the gases produced within said casing separate from one another; said third member having a chamber at its upper end and a tortuous liquid supply passage leading therefrom and discharging into the interior of said casing, a second chamber communicating with the interior of said casing, and a gas offtake conduit leading from said last mentioned chamber.

23. An electrolytic gas generator of the kind described comprising a plurality of electrodes of opposite polarity; means arranged out of the path of the current and forming a support for a diaphragm, and forming also two non-communicative gas chambers and coöperating with said electrodes to confine an electrolyte between said electrodes; and a gas inpervious diaphragm intermediate said electrodes and carried by said means, said means being so constructed as to permit a flow of electrolyte from one side of said diaphragm to the other.

In testimony whereof I have signed my name to this specification this 14 day of May, 1917.

ISAAC H. LEVIN.

Witnesses:
A. M. VANDELL,
E. E. DUNCAN.